W. M. MARTIN.
APPARATUS FOR THE WATER CONCENTRATION OF ORES, SLIMES, AND THE LIKE.
APPLICATION FILED JUNE 22, 1915.
1,207,312.  Patented Dec. 5, 1916.
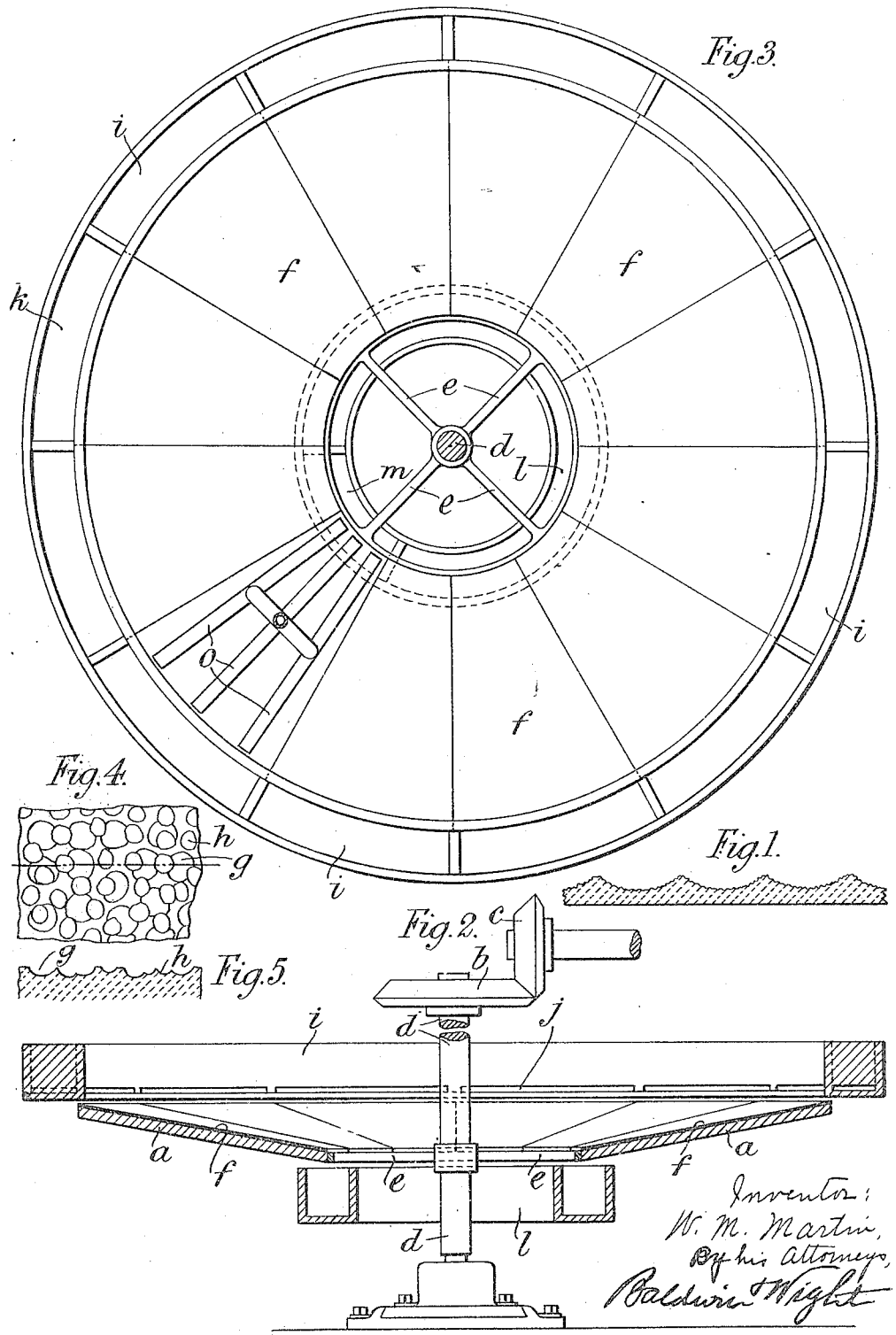

UNITED STATES PATENT OFFICE.

WILLIAM MORLEY MARTIN, OF CORNWALL, ENGLAND.

APPARATUS FOR THE WATER CONCENTRATION OF ORES, SLIMES, AND THE LIKE.

1,207,312. Specification of Letters Patent. Patented Dec. 5, 1916.

Application filed June 22, 1915. Serial No. 35,645.

*To all whom it may concern:*

Be it known that I, WILLIAM MORLEY MARTIN, a subject of the King of Great Britain, residing at Meadowcroft, West Trewirgie, Redruth, Cornwall, England, have invented new and useful Apparatus for the Water Concentration of Ores, Slimes, and the like, of which the following is a specification.

This invention relates to improved apparatus for use in the water concentration of ores and the like and more particularly slimes.

In the accompanying drawings:—Figure 1 shows a section of the concentrating glass surface preferably employed. Fig. 2 is a vertical section, and Fig. 3 is a plan of a concentrating round frame. Figs. 4 and 5 show diagrammatically details of the concentrating glass surface employed.

In such apparatus various materials have been proposed for the surface over which the ore and water pass, but even at the present time so ineffective are the usual surfaces in use that with difficult ores, for example tin ores or slimes, very poor extractions are obtained.

The surface should present small hindrance to the flow of the gangue but should be provided with regular markings adapted to cause great hindrance to the flow of the values and these markings differ according to the ore to be dressed.

According to one feature of this invention an acting surface suitable for many ores consists of a vitreous substance such as frosted glass, glass being a material eminently suitable for the purpose as it permits an easy flow and can easily and cheaply be provided with frostings which can be graded with extreme exactness without impairing the first quality, but it is conceivable now that the general nature of the problem and the means by which it is overcome have been pointed out that other surfaces provided with frostings such, for instance, as brick tile and porcelain may be found suitable. The results obtained are remarkable and recoveries hitherto considered impossible can be obtained.

The glass is placed in sections on the table or vanning shovel with rubber joints between the sections in such a manner that there shall not be any run which is all rubber.

The concentrating frame, as shown, consists of a round table $a$ inclined toward the center and leaving a central opening. It is rotated by any convenient means through bevel wheels $b$ and $c$, a shaft $d$ and spokes $e$.

$f$ indicates twelve pieces of glass abutting together and forming the acting surface of the table. The surface of the glass is provided with a series of frostings of different size as indicated at $g$ and $h$ in Figs. 4 and 5.

$i$ is a launder supplied with water which passes through a hole $j$ which extends throughout the launder on the periphery of the table.

$k$ is a launder supplied with pulp which floats on to a portion of the periphery of the table.

$l$ is a launder into which the gangue is washed from off the table and $m$ is a launder into which the values are washed by downwardly directed jets of water issuing from pipes $o$.

*Grading the surface.*—I preferably produce a surface of the exact grading desired by treating it with sand of a definite mesh in a sand blast machine different and substantially definite frostings being obtained with sands of different mesh. I may moreover provide a frosted surface consisting of frosts of varying sizes which is of great value when the material to be treated contains values of varying sizes. This may be effected by grinding a glass surface three-eighths of an inch thick with powdered emery whose particles are of uniform size so as to produce a uniform surface. The glass is then subjected to a sand blast first with a sand of one size, say 60 mesh, and then with a sand of another size, say 40 mesh, the other conditions being the same. By this means several different sized frostings may be obtained on the same glass surface.

*Treatment of slimes.*—With the surface hitherto employed the retardation value is insufficient to prevent particles of mineral less than about 1/3000th of an inch from being washed away with the gangue. I find that by my invention much smaller particles can be recovered and that the finer the slime particles the finer the grade of surface necessary for their recovery. In a general way 60 mesh sand will give a surface which will retain the mineral in a slime down to about a 10,000th of an inch, but the best grade can be quickly ascertained by allowing crude slime pulp to flow over a few strips of varying graded frosts and noting the result. I also find that the lower the specific gravity of the mineral treated the coarser must be the grade of frost with an equality in the size of the particles. A surface which I find useful in some cases consists of a corrugated surface each wave length being about three quarters of an inch long and one eighth of an inch deep, the surface being subsequently frosted as hereinbefore described.

Fig. 1 illustrates the corrugated surface in which each wave length is about three quarters of an inch long and one eighth of an inch deep before frosting.

Preferably the frosted surface is placed on the table of an ordinary concentrating round frame in sections, the gangue being washed off while the loaded frosts or frosted flutes are discharged each revolution of the table by a downward jet of water and a scrubber. This is illustrated in Fig. 2.

What I claim is:—

1. In an apparatus for concentrating ores, an acting surface consisting of frosted vitreous material which causes little resistance to the movement of the gangue but the regular frostings of which form a series of pits which are adapted to cause great hindrance to the values in combination with means for delivering material to be concentrated suspended in water to said surface.

2. In an apparatus for concentrating ores, an acting surface consisting of vitreous material which causes little resistance to the movement of the gangue but which has upon it a plurality of regular frostings containing a multiplicity of pits of different sizes adapted to cause great hindrance to the values in combination with means for delivering material to be concentrated suspended in water to said surface.

3. In an apparatus for concentrating ores, an acting surface consisting of glass having upon it a plurality of regular frostings having a multiplicity of pits of different sizes in combination with means for delivering material to be concentrated suspended in water to said surface.

4. In an apparatus for concentrating ores, an acting surface consisting of frosted glass which causes little hindrance to the movement of the gangue but the regular frostings of which are adapted to cause great hindrance to the values in combination with means for delivering material to be concentrated suspended in water to said surface.

5. In an apparatus for concentrating ores, an acting surface consisting of sand-blasted glass the regular frostings of which form a series of pits which are adapted to cause great hindrance to the values in combination with means for delivering material to be concentrated suspended in water to said surface.

6. In apparatus for concentrating ores, an acting surface consisting of a material which causes little resistance to the movement of the larger particles, but has upon it regular frosted flutings adapted to cause great hindrance to the smaller particles in combination with means for delivering material to be concentrated suspended in water to said surface.

7. In apparatus for concentrating ores, an acting surface consisting of a fluted and frosted vitreous substance in combination with means for delivering material to be concentrated suspended in water to said surface.

8. In apparatus for concentrating ores, an acting surface of fluted and frosted glass in combination with means for delivering material to be concentrated suspended in water to said surface.

9. In apparatus for concentrating ores, an acting surface consisting of a material which causes little resistance to the movement of the larger particles but has upon it regular frosted flutings each wave length of the flutings being about three quarters of an inch long and one eighth of an inch deep in combination with means for delivering material to be concentrated suspended in water to said surface.

10. Apparatus for concentrating ores comprising a revolving concentrating table whose acting surface consists of frosted and fluted glass in combination with means for delivering material to be concentrated suspended in water to said surface.

WILLIAM MORLEY MARTIN.